July 3, 1928.
P. HOLMES
MOWING MACHINE
Filed April 30, 1926
1,676,088
3 Sheets-Sheet 1
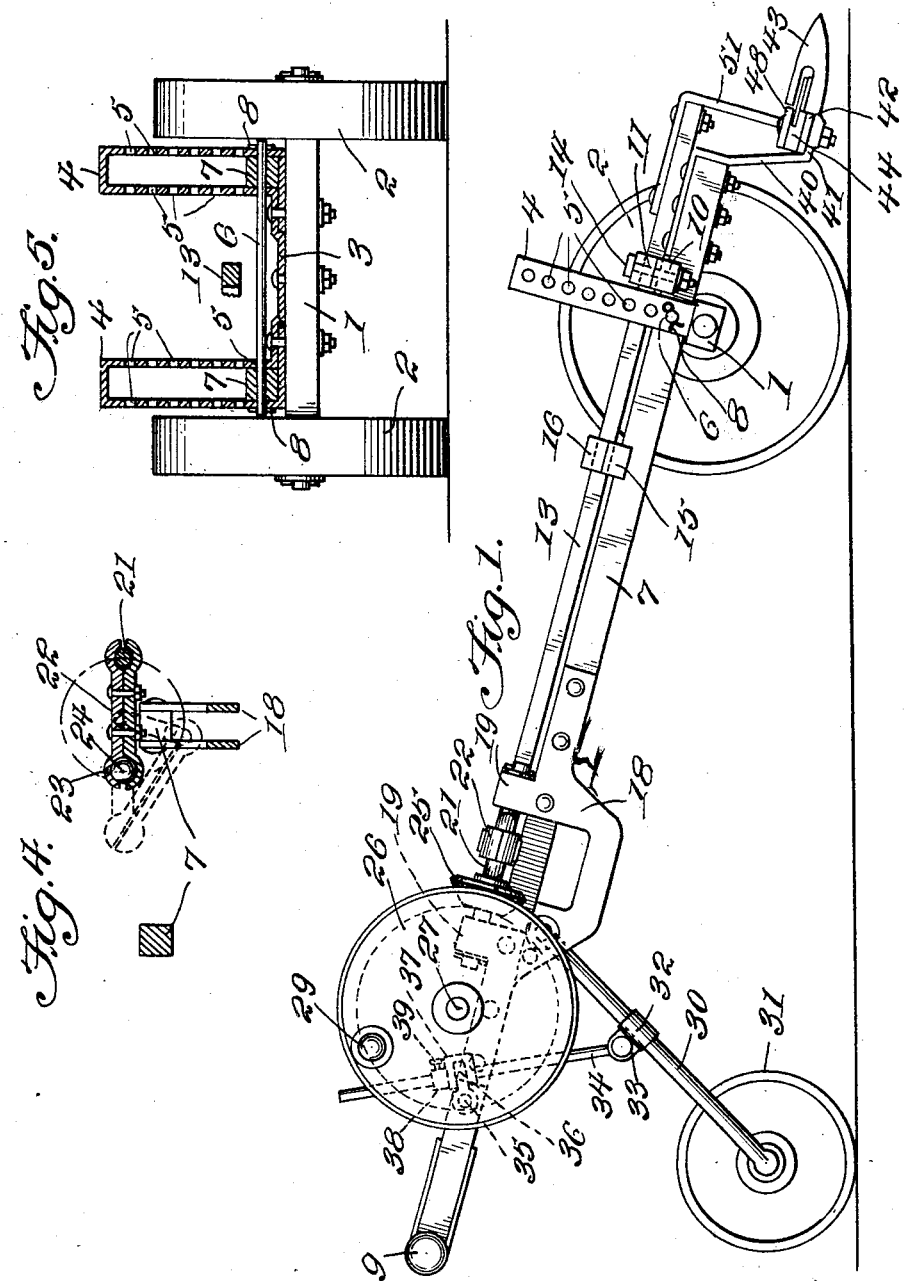
Pedro Holmes
INVENTOR
BY Victor J. Evans
ATTORNEY
WITNESS:

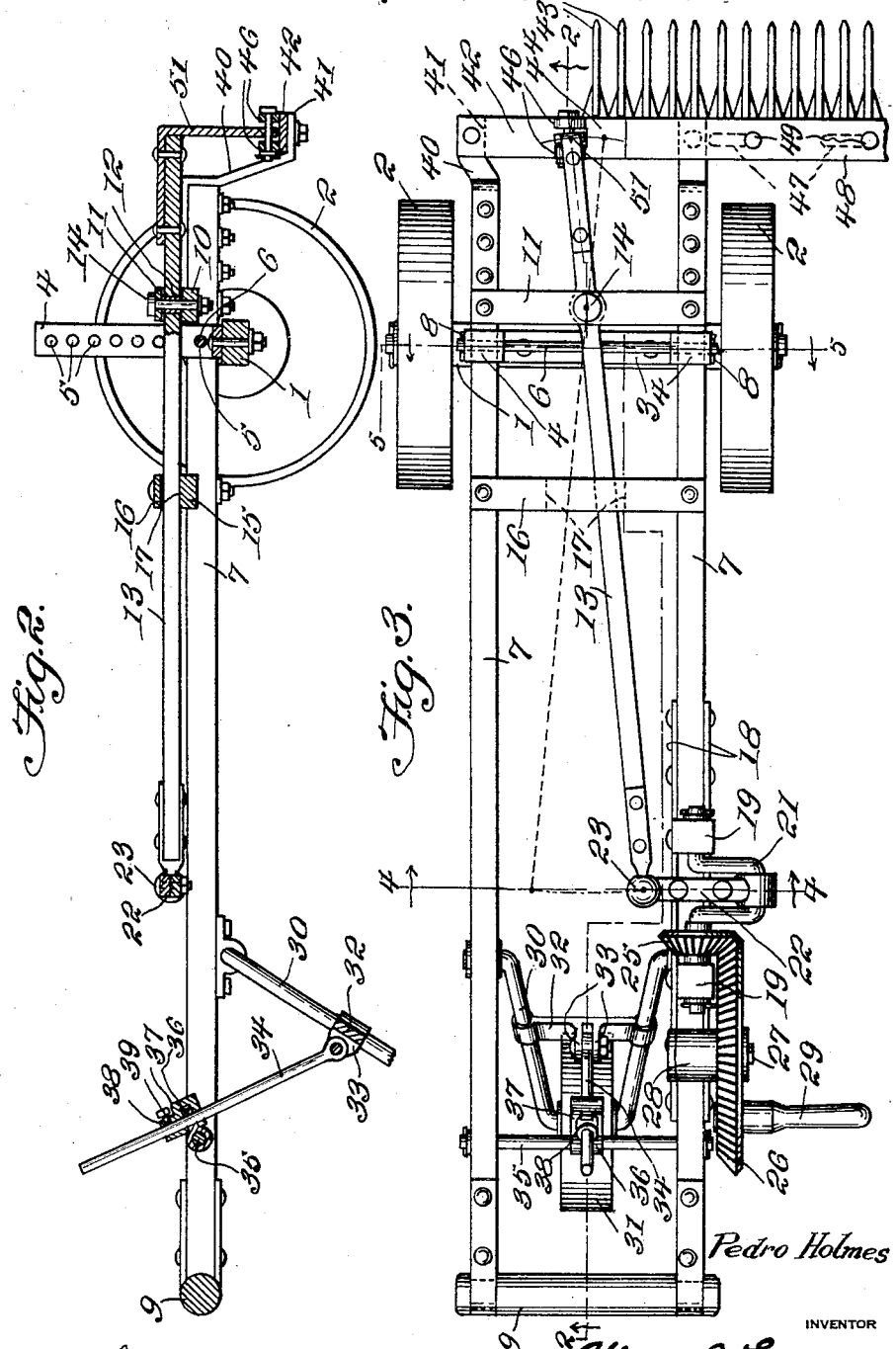

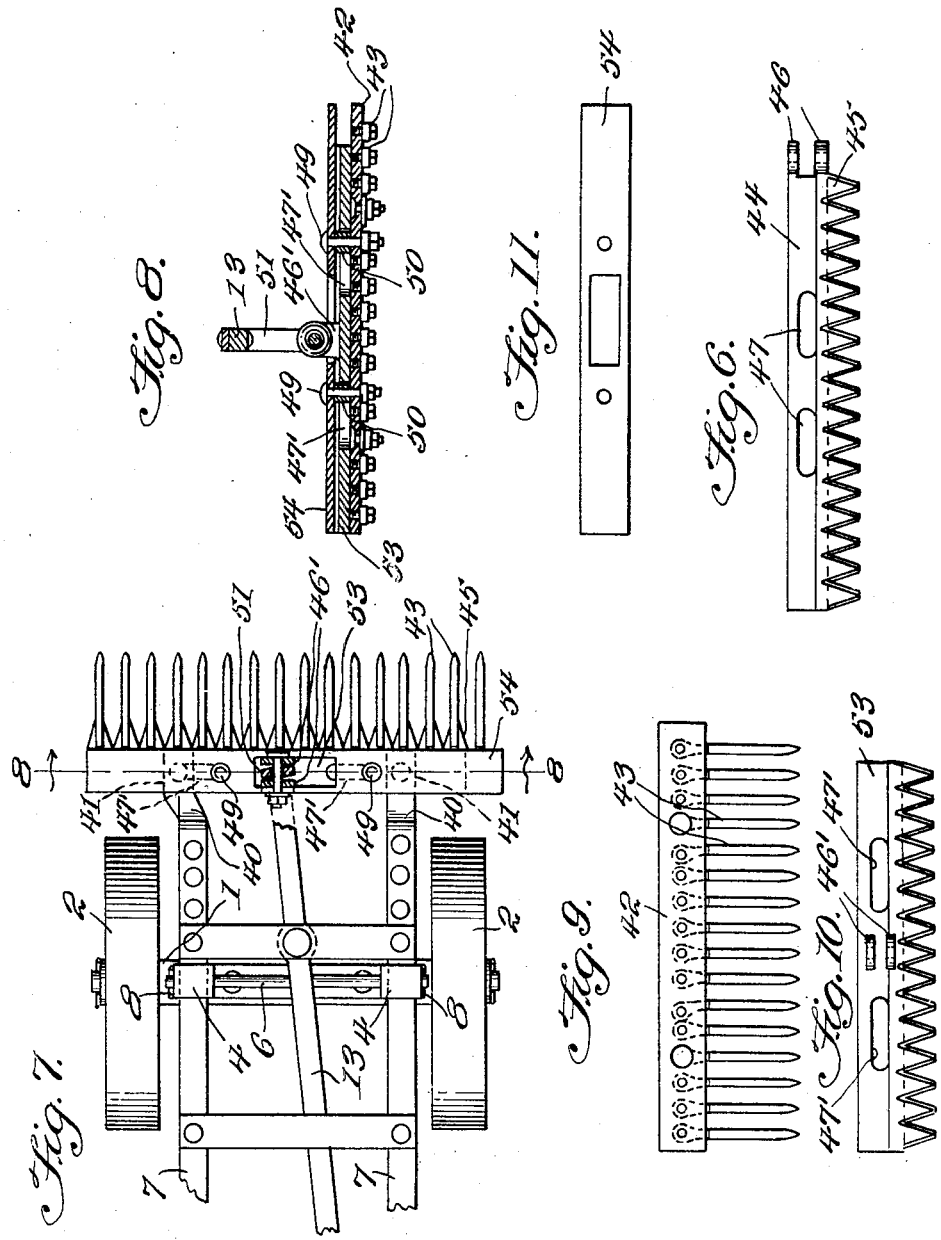

Patented July 3, 1928.

1,676,088

UNITED STATES PATENT OFFICE.

PEDRO HOLMES, OF KANSAS CITY, KANSAS.

MOWING MACHINE.

Application filed April 30, 1926. Serial No. 105,804.

My present invention has reference to a mowing machine, designed for cutting grass on lawns, along sidewalks, railway tracks or other places, weeds and other growths between growing plants, hedges and the like, one of the objects of the invention being the provision of a machine for this purpose which is hand operated and which is adjustable for the convenience of the operator and likewise for regulating the depth of the cut made thereby.

A still further object is the provision of a hand propelled and hand operated mowing machine of a simple type and in which the cutting mechanism may be arranged centrally with respect to the line of draft of the machine or to either side thereof to suit varying conditions.

A still further object is the provision of a hand operated and propelled mowing machine of the sickle type in which provision is made for the free reciprocation of the cutters between the guard fingers of the finger bar.

A still further object is the provision of a mowing machine that is of a comparatively simple construction, cheaply manufactured, and easily operated.

To the attainment of the foregoing and other objects which will present themselves as the nature of the invention is better understood, reference is to be had to the drawings which accompany and form part of this application.

In the drawings:

Figure 1 is a side elevation of the improvement.

Figure 2 is a section on the line 2—2 of Figure 3.

Figure 3 is a top plan view of the improvement.

Figure 4 is a sectional view on the line 4—4 of Figure 3.

Figure 5 is a sectional view on the line 5—5 of Figure 3.

Figure 6 is a plan view of the cutter bar.

Figure 7 is a fragmentary plan view showing the cutting mechanism arranged at the center of the machine.

Figure 8 is a sectional view on the line 8—8 of Figure 7.

Figure 9 is a top plan view of the finger bar.

Figure 10 is a plan view of a modified form of cutter bar.

Figure 11 is a plan view of the cover plate for the cutting mechanism illustrated by Figures 7, 8, and 10.

The front axle 1 of the improvement has its central or body portion square or rectangular in cross section and its ends provided with spindles for the front wheels 2. Secured on the top of the axle 1, between the wheels 2, there is a plate 3. The plate, at its ends, is formed with upstanding yokes 4. The parallel members of the yokes are provided with spaced aligning apertures 5 and through these apertures there is passed a pivot rod 6 that also passes through openings in the parallel side members 7 of the frame of the improvement. In this manner it will be noted that the frame may be vertically adjusted with respect to the axle 1 and to the wheels 2. Preferably the rod 6 has both of its ends apertured for the reception of removable elements such as cotter pins 8. The side members of the frame may be in the nature of wooden beams which are light but strong and these members at desired points are connected and held in spaced relation by transverse plates. The rear end of the members are connected together by a handle 9 which is grasped by the operator in guiding the machine.

One of the transverse brace and connecting members for the sides of the frame is disposed slightly forward of the axle 1 and is indicated for distinction by the numeral 10. Over the member 10 there is preferably arranged a plate 11, and the bolts that secure the member 10 to the sides of frame likewise connect the plate therewith. The plate is centrally formed on its under face with a cut-away portion that has received therein a metal sleeve 12 that passes through an opening in the rocker arm 13. Passing through the plate 11, the sleeve 12 and the member 10, there is a pivot bolt 14. The rocker arm has a portion arranged over the inner connecting member 15 for the sides of the frame and over the connecting member 15 there is a plate 16, similar to the plate 11 and secured on the frame in the same manner. The plate 16 is centrally provided on its under face with an elongated opening 17 through which the rocker arm 13 passes.

One of the side members 7 of the frame is preferably cut away, but the elements constituting the said side member of the frame are connected by brackets 18. The bracket has a central depressed portion and upstanding lugs 19 in align with the end walls provided by the said depression. In the lugs 19 there are journaled the straight ends of a crank shaft 21, the said crank shaft sweeping through the depression in the bracket on the turning of the shaft. To the crank portion of the shaft 21 there is secured a pitman. The pitman, as disclosed in Figure 4 of the drawings, comprises two connected plates, each of a similar construction and designated by the numeral 22. The pitman at one of its ends has a rounded depression or opening to receive therethrough the crank shaft 21 and its opposite end is formed with a socket 23 to receive therein a ball head 24 on the end of the rocker arm 13.

One of the straight ends of the crank shaft 21 has fixed thereon a beveled pinion 25 that is in mesh with a bevel gear 26 whose shaft 27 is journaled in a suitable bearing 28 on the referred to sectional side member 7 of the frame. On its outer and plain face the gear 26 is provided with a handle 29. It will be apparent that by revolving the gear 26 the turning of the crank shaft 21 will impart a reciprocatory or rocking movement through the rocker arm 13.

Journaled in suitable bearings in the side members 7 of the frame there are the straight ends of a crank axle 30. On the straight connecting portions for the arms of the crank axle there is journaled a caster wheel 31. On the angle arms of the crank axle 30 there is fixed a plate 32 that is formed with spaced ears 33. Pivoted between the ears 33 there is a rod 34. The numeral 35 designates a rod that passes through and is removably secured to the side members 7 of the frame. This rod is arranged in close proximity to the handle 9. Held from longitudinal movement but swingable on the rod 35 there is an ear 36. The rod 34 passes through the ear, but also passes through openings in a substantially U-shaped bracket 37 that receives the ear 36 between the arms thereof. On the outer face of the bracket 37 there is an integral hollow boss 38 through which the rod 34 also passes, while threaded through an opening in the boss there is the binding element 39 to engage the rod. By this arrangement it will be noted that the rear of the frame may be vertically adjusted with respect to the caster wheel 31 to regulate the depth of the cut made by the cutting mechanism presently to be described. Thus it is to be noted that both the forward and rear end of the frame may be adjusted with respect to the supporting or ground wheels therefor so that not only is the depth of the cut regulated but the machine has its handle portion conveniently arranged with respect to the operator whereby operators of varying sizes may properly propel and operate the machine. It is to be noted that the operating wheel 26 is to be arranged at the right hand side of the frame and conveniently positioned with respect to the handle 9 and consequently with respect to the operator.

The forward ends of the sides 7 of the frame have secured upon their upper faces metal plates having outer depending angle portions 40 that merge into straight extensions 41. On these extensions there are secured the plate 42 that carries the finger bar 43. The cutter bar 44 which reciprocates over the finger bar in the construction now referred to has one of its ends bifurcated and formed with upstanding ears 46. The cutter bar is provided with spaced longitudinally extending elongated openings 47 and over the cutter bar a cover plate 48 is arranged, there being bolt members 49 passing through the cover plate, through the openings 47 in the cutter bar and through the finger bar, being secured to the latter by suitable nuts. Each bolt is surrounded by a revoluble sleeve 50 which may contact with the side walls provided by the openings 47 and whereby friction which would be occasioned by the reciprocation of the cutter bar is materially reduced. The rocker arm has secured on its outer end an angle plate 51 whose lower end is pivotally secured between the ears 46.

By reference to Figure 3 of the drawings it will be noted that the cutting mechanism is arranged at the right hand side of the frame, but by rearrangement of the parts the said cutting mechanism may be arranged at the opposite side.

In Figure 7 the cutting mechanism is arranged at the center of the frame and the cutting mechanism is of a construction similar to that described except that the cutter bar 53 has the ears 46' arranged at the center thereof, and all the slots 47' to the sides of the ears. The angle end of the rocker arm is, of course, pivotally secured between the ears. The numeral 54 designates the cover plate for the cutting mechanism. This plate 54 has a central opening through which the ears 46' pass and rounded openings at the sides of the central opening. Through these last mentioned openings there are passed the bolts 49 that secure the cover plate upon the type of cutting mechanism illustrated by Figures 7 and 8 of the drawings.

The simplicity of my construction and the manner in which the cutting mechanism may be actuated at the will of the operator will, it is thought, be perfectly apparent to those skilled in the art to which this invention relates as will the manifest advantages of the improvement so that further detail description will not be attempted. It is, of course, to be understood that I am not to be restricted to the precise details herein set forth and hold myself entitled to make such changes therefrom as fairly fall within the scope of what I claim without departing from the spirit or sacrificing any of the advantages of the improvement.

Having described the invention, I claim:—

1. A mowing machine including a frame having side members, ground wheels, yokes on the axle for the ground wheels through which the side members of the frame are received, means for vertically adjusting and supporting the frame in the yokes, a cutting mechanism at the forward end of the frame said cutting mechanism including a cutter bar and a finger bar, hand operated means for reciprocating the cutter bar over the finger bar, a crank axle pivotally secured to the frame adjacent to the rear thereof, a caster wheel journaled on the crank axle, means for swingably adjusting the crank axle with respect to the frame and means for holding the crank axle so adjusted.

2. A mowing machine including a frame having side members, ground wheels having an axle whose body portion is square in cross section, apertured yokes on the axle through which the side members of the frame pass, an element passing through the apertures in the yokes and through the side members of the frame for adjusting the frame with respect to the ground wheels, a cutting mechanism at the forward end of the frame and arranged therebelow, said cutting mechanism including a cutter bar and a finger bar, a rocker arm pivoted to the frame, guide means for the rocker arm, means connecting the rocker arm to the cutter bar of the cutting mechanism, a crank shaft journaled on one of the sides of the frame, a pitman connection between the crank shaft and the rocker arm, hand operated revoluble means for imparting motion to the crank shaft, a crank axle having its ends pivotally secured to the frame, and a caster wheel journaled adjacent to the rear of the frame and adjustably supported thereon.

3. A hand propelled and hand operated mowing machine having a cutting mechanism at the forward end thereof, said cutting mechanism including a finger bar and a cutter bar, ground wheels for the frame, means for supporting the frame at various elevations with respect to the ground wheels, a crank axle having straight ends which are journaled in the frame, a caster wheel on said axle, a member connecting the sides of the frame, a pivotally supported ear on said member, a U-shaped bracket engaging the ears, a rod pivotally secured to the crank axle and passing through the bracket and through the ears, means carried by the bracket frictionally engaging the rod for holding the crank axle at desired angles with respect to the frame, a handle on the rear end of the frame and means operable from the side of the frame adjacent to said handle for reciprocating the cutter bar over the finger bar of the cutting mechanism.

In testimony whereof I affix my signature.

PEDRO HOLMES.